United States Patent [19]

Roos

[11] Patent Number: 4,517,632

[45] Date of Patent: May 14, 1985

[54] OPERATING THEATRE LAMP

[75] Inventor: Eberhard Roos, Tuttlingen, Fed. Rep. of Germany

[73] Assignee: Delma- elektro- und medizinische Apparatebau Gesellschaft mbH, Tuttlingen, Fed. Rep. of Germany

[21] Appl. No.: 552,646

[22] Filed: Nov. 17, 1983

[30] Foreign Application Priority Data

Nov. 25, 1982 [DE] Fed. Rep. of Germany ....... 3243709

[51] Int. Cl.[3] ........................ F21V 21/28; B60T 13/04; F16D 65/34

[52] U.S. Cl. ...................................... 362/389; 128/18; 188/163; 188/171; 362/276; 362/394; 362/419; 362/427; 362/802; 362/804

[58] Field of Search ................... 362/6, 269, 271, 272, 362/274, 276, 285, 286, 287, 288, 386, 389, 394, 395, 401, 402, 411, 418, 419, 427, 449, 802, 804; 128/18, 22, 23, 395, 396; 433/27, 28, 29, 141; 188/156, 158, 161, 163, 164, 171, 173; 310/77, 93; 403/83; 248/324, 325

[56] References Cited

U.S. PATENT DOCUMENTS

| | | | |
|---|---|---|---|
| 2,837,664 | 5/1957 | Lindstrom et al. | 188/171 X |
| 3,084,310 | 4/1963 | Schurr | 188/161 X |
| 3,599,922 | 8/1971 | Junginger | 362/804 X |
| 3,812,936 | 5/1974 | Dane | 188/171 |
| 4,097,919 | 6/1978 | Bobrick et al. | 362/804 X |
| 4,139,883 | 2/1979 | Ilzig et al. | 362/804 X |
| 4,288,844 | 9/1981 | Fisher et al. | 362/804 X |
| 4,316,237 | 2/1982 | Yamade et al. | 362/804 X |
| 4,390,932 | 6/1983 | Matsui et al. | 362/804 X |

FOREIGN PATENT DOCUMENTS

| | | | |
|---|---|---|---|
| 2532946 | 1/1977 | Fed. Rep. of Germany | 362/804 |
| 3048766 | 7/1982 | Fed. Rep. of Germany | 188/161 |
| 7409286 | 1/1975 | Netherlands | 362/804 |
| 819836 | 9/1959 | United Kingdom | 362/804 |

OTHER PUBLICATIONS

The Thomas Register, 1983, pp. 14394 and 14395.

*Primary Examiner*—David H. Brown
*Assistant Examiner*—John E. Griffiths
*Attorney, Agent, or Firm*—Townsend and Townsend

[57] ABSTRACT

An articulated operating theatre lamp has a handle (19, 20) by means of which it can be moved about several axes. The constructional elements which are movable relative to one another (11, 12, 13, 14, 15, 16) are normally secured relative to one another by means of mechanically applied but electrically releasable brakes (18) arranged in the vicinity of their hinged connections (17). Electrical switch means 21 are provided on the handle (19, 20), which actuate the electrical release mechanism (22) for the brakes (18) on being contacted by an operator and thus temporarily release the brakes during handling of the lamp (FIG. 1).

9 Claims, 3 Drawing Figures

OPERATING THEATRE LAMP

Figure 2:
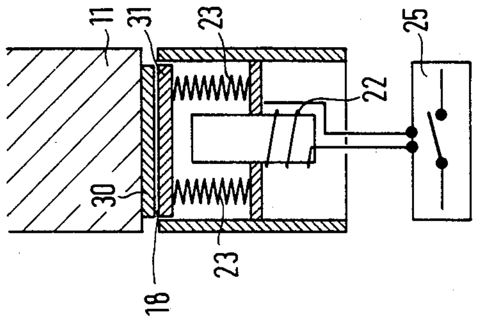

The invention relates to an articulated operating theatre lamp having at least one handle by means of which it can be moved by an operator about at least one pivot axle and/or along an elongate slide track into a desired fixed position.

Such operating theatre lamps are in general secured via a linkage which is pivotable about numerous axles to the ceiling of an operating theatre, or to a suitable framework, in such a way that they can be moved by the operator into a plurality of positions in order, in this way, to be able to ideally illuminate an operating site on an operating table.

Whereas a certain ease of movement of all bearings is required during adjustment of the operating theatre lamp a position of the lamp body which is as immovable as possible should be present after adjustment of the operating theatre lamp and indeed this position should not change if, for example, the lamp body or its support linkage is accidentally knocked. In known operating theatre lamps a certain stiffness of all bearings is provided for this purpose, in order to provide a suitable compromise between the ease of movement required for adjustment and the fixation required after adjustment.

The object of the present invention is now to provide an operating theatre lamp of the initially named kind which adopts a position prior to and after adjustment which cannot be readily shifted, but which can however be adjusted with ease of movement without the operator having to execute any conscious manipulations.

In order to satisfy this object the invention provides that the constructional elements which are movable relative to one another are normally fixedly secured relative to one another by mechanically engaged but electrically releasable brakes provided in the vicinity of their pivotal and/or displaceable joints; and in that electrical switch means are provided at the handle which, on contact by the operator, actuate the electrical release mechanism of the brakes, and thus temporarily release the brakes during handling.

The inventive thought is thus be seen in the fact that the handles, which are in any case grasped by the operator during adjustment of the operating theatre lamp, are combined with switch means in such a way that the operator automatically and unconsciously actuates these switch means on grasping the handles. In this way the brakes, which ensure a fixed position of the operating theatre lamp prior to and after adjustment, are automatically released so that, in contrast to the remaining time periods, ease of movement is obtained for all rotary and displaceable joints when an operator grasps the handles in order to adjust the body of the lamp.

In accordance with a practical embodiment which is simple to realise, the brakes are maintained in their braking position by springs and the release mechanism consists of one or more electromagnets.

The switch means at the handles can be realised in a very simple manner which is not visible from the exterior, in that the handles are electrically insulated relative to the body of the lamp; and in that a sensor having a capacity relative to earth is arranged in the handle as the switch means, with the sensor acting on a switch connected to the release mechanism via an electrical control circuit which responds to capacity changes.

As a result of the construction of the invention it is particularly expedient for the rotary bearings or telescopic connection parts provided at the joints to be extremely easy to move. This is an advantage during adjustment but does not however in any way hinder the exact fixation of the operating theatre lamp after adjustment, because the brakes are then operative.

An expedient further development of the invention is characterised in that the brake torque of the brakes can be selected so that in the event of power failure or failure of the electrical control the body of the lamp and the carrying rods can be moved about all the axes and along all the slide tracks in the same way as with a conventional embodiment with permanently braked rotary bearings and/or slide tracks.

It is particularly expedient if all the release mechanisms are connected in parallel and in such a way that the blocking or unblocking of all rotary bearings or slide tracks takes place simultaneously.

The invention thus provides an operating theatre lamp with a suspension device which makes it possible for the surgeon or one of his assistants to ideally direct the light beam of the actual lamp body onto the operating site by appropriate adjustment, with only minimal forces having to be exerted to move the lamp body about its various axes of movement (as a result of extreme ease of movement of all the rotary bearings). Furthermore troublefree retention in the ideal position is ensured as a result of the reliable braking effect of the mechanically engaged brakes. The ease of movement of the individual joints can be achieved by inbuilt ball or taper roller bearings.

The handles can be constructed as sterilisable handgrips or handlebars on the lamp body and are electrically insulated relative to the lamp body. The handles have a defined capacity relative to the earthed body of the lamp and this capacity changes on contact by the hand of the operator. The change of capacity is registered by the control circuit which in turn passes the signal to an amplifier and thereby brings about the release of the brakes at the rotary bearings.

Figure 1:
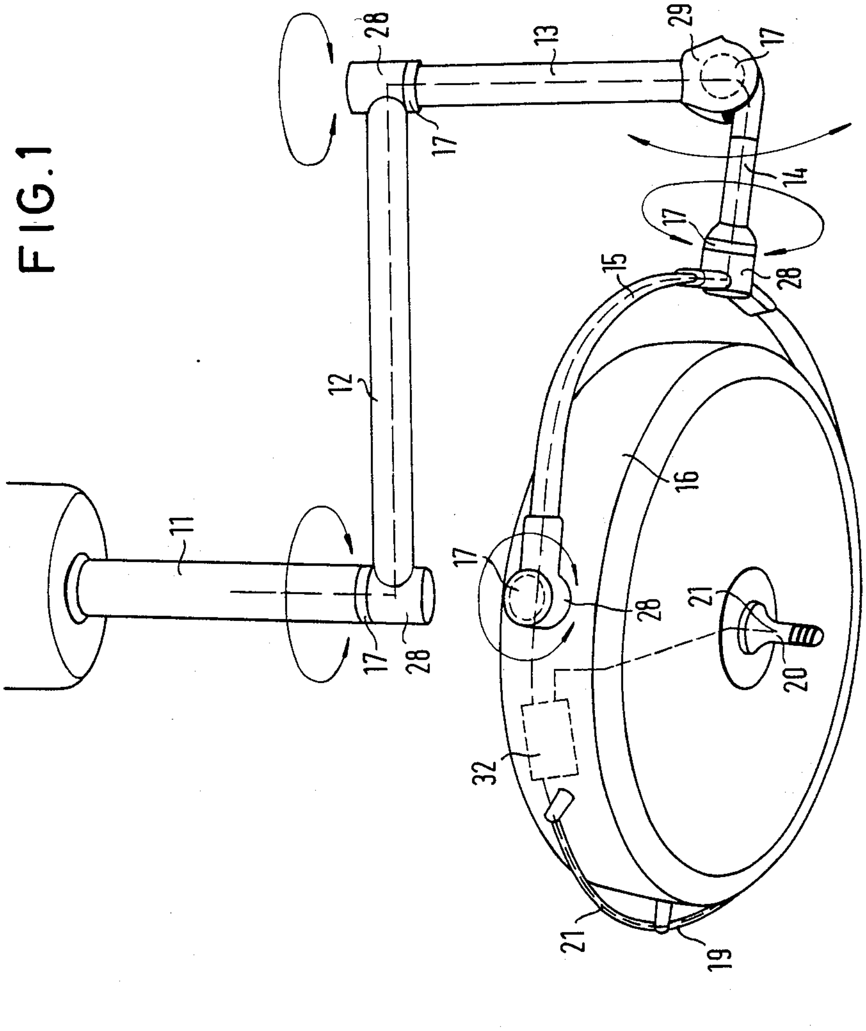
Figure 3:
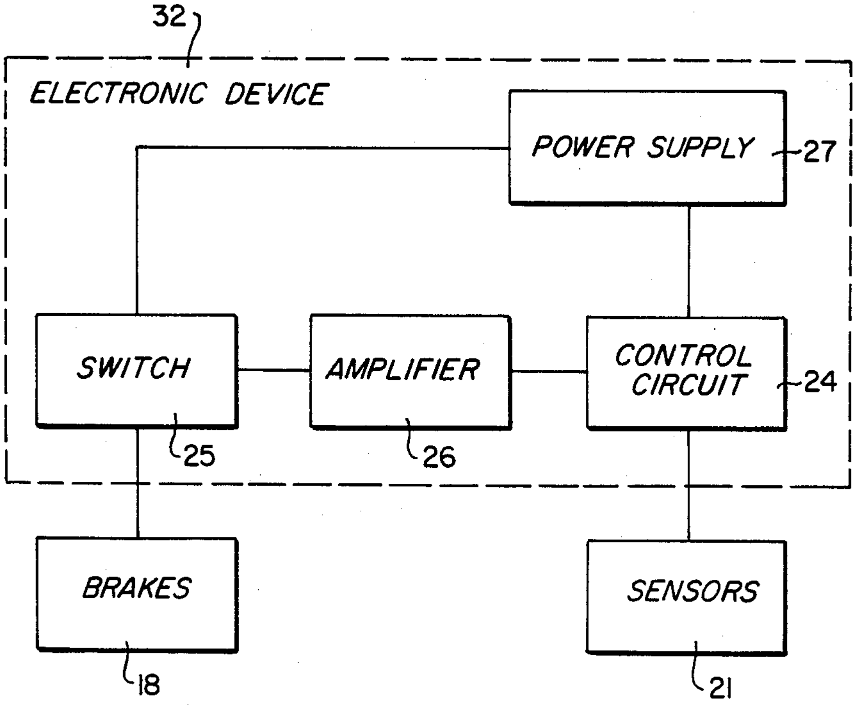

The invention is described in the following by way of example and with reference to the drawings which show:

FIG. 1 a perspective view of an operating theatre lamp with the associated support linkage in accordance with the invention, FIG. 2 a schematic view of a brake which can be used with the operating theatre lamp, the brake having a release mechanism constructed as an electromagnet, and FIG. 3 a block circuit diagram of the electrical control for the operating theatre lamp.

As seen in FIG. 1 a horizontal boom 12 is rotatably mounted at an angle of 90° on a vertical central bearing shaft 11 which is secured to the ceiling of the operating theatre. The boom 12 is mounted on the central bearing shaft 11 via a rotary bearing 28 for rotation about the central axis of the central bearing shaft 11. The length of the boom determines the total radius of swing of the lamp body 16. A downwardly extending vertical tube 13 is pivotally attached about a vertical axle to the outer end of the boom 12 via a further rotary bearing 28. A non-illustrated spring mechanism is housed inside of the vertical tube 13 and acts on a spring hinge 29 arranged at the lower end of the vertical tube. A short, essentially horizontal, carrying rod 14 is pivotally secured to the spring hinge 29 about a horizontal axis.

The support fork or element 15 for the actual body of the lamp 16 is rotatably attached to the end of the short carrier rod 14 remote from the spring hinge 29 via a further rotary bearing 28 with an axis of rotation which is aligned with the central axis of the rod 14. Rotary bearings 28 at the ends of the fork pivotally support the operating theatre lamp about a horizontal axle which is at right angles to the pivot axis of the rotary bearing 28 at the end of the bar 14. The lamp body 16, which is equipped with one or more light sources, with filter glasses, a mechanism for adjusting the focus and with a cover of safety glass, has a considerable weight. Thus relatively strong lever forces act on the central bearing shaft 11, on the boom 12 and on the vertical tube 13. These lever forces can generate displacement from the vertical and horizontal axes through bending of the named parts. In order to prevent movement of the lamp body out of the selected position for optimum illumination of the site of the operation, the rotary bearings 28 at the ends of the boom 12 must be braked sufficiently hard that the torque exerted at these bearings cannot bring about the unintentional movement of the lamp body 16, even with an extreme overhang of the lamp body. The remaining rotary bearings 28 and the spring hinge 29 must also be braked because the absolute compensation of the spring characteristics of the spring compensation mechanism arranged in the tube 13, and thereby a constant spring pressure at the spring hinge 29, could only be realised at high cost. The spring compensation mechanism in the tube 13 must practically balance the weight of the lamp body 16, the weight of the rod 14 and the weight of the fork 15.

The tilting of the lamp body about the axes of the rotary bearings 28 at the fork 15, for example on hanging up a microphone for the dictation of findings during an operation, must be prevented.

The handling of the lamp body 16 is effected either by handle bars 19 arranged at is periphery opposite to the fork 15 or by a sterilisable handgrip 20 centrally arranged beneath the lamp body.

In accordance with the invention brakes 18 are now provided at the joints 17 between the relatively movable constructional elements 11, 12, 13, 14, 15, 16 of the operating theatre lamp. The basic construction of the brakes is shown in FIG. 2. As seen in FIG. 2 a brake surface 30 is provided, for example on the central bearing shaft 11 and cooperates with a brake pad 31 which is movable relative thereto and which mounted on the boom 12. The brake pad 31 is normally pressed by springs 23 against the brake surface 30 so that the central bearing shaft 11 and the boom 12 can only be moved relative to one another with difficulty or not at all. An electromagnet 22, which can be supplied with current and correspondingly energised on closing a switch 25, is arranged at a certain distance beneath the brake shoe 31. On being energised the electromagnet attracts the appropriately magnetically constructed brake shoe or pad 31 and releases it from the brake surface 30. The two constructional elements 11, 12 are now only connected together by the rotary bearing 28 which is constructed for ease of movement and can easily be rotated relative to one another.

On renewed opening of the switch 25 the brake pad 31 is again pressed by the springs 23 against the brake surface 30 and the constructional elements 11, 12 are again essentially fixed relative to one another.

Corresponding brakes are also provided at the remaining joints 17.

The actuation of an electromagnet 22, which represents a release mechanism, at the brakes within the joints 17 will now be described in detail with reference to FIGS. 1 and 3:

An electronic device 32 which contains a power supply 27, a control circuit 24, an amplifier 26 and the switch 25 is built into the operating theatre lamp.

Leads from sensors 21 which are accommodated in the handle bars 19, or in the sterilisable handgrip 20, lead to the input of the control circuit 24. The output of the electronic device 32 supplies the excitation current for the electromagnets 22 at the joints 17 when the switch 25 is closed. The various electrical connection lines between the electronic apparatus 32, the handlebars 19, the handgrip 20 and the electromagnets 22 are illustrated in broken lines in FIG. 1.

It is important that the metallic sensors 21 accommodated in the handlebars 19 or in the sterilisable handgrip 20 are electrically insulated against all earthed parts so that they have a defined capacity relative to earth. It is for this reason that the capacity relative to earth potential increases when the handlebars 19 or handgrip 20 is grasped by an operator, because each person likewise represents an unavoidable capacity relative to earth potential. The total capacity of the sensors 21 relative to earth potential is thus increased when touched by a person.

The control circuit 24 of FIG. 3 registers an increase of capacity of this kind and in this case transmits a signal to the amplifier 26 which then brings about closing of the switch 25. An excitation current now flows from the power supply 27 to all the electromagnets 22 at the joints 17. As a result the brake shoes 31 (FIG. 2) all lift away from the associated brake surfaces 30. In this connection it should be emphasised that the brakes of the type shown in FIG. 2 are located at each joint 17 and that all the electromagnets are connected in parallel and are jointly energised by closing of the switch 25.

In this manner the brakes are released between the constructional elements which are rotatable relative to one another at all the joints 17 as long as a person is holding onto the handlebars 19 or onto the handgrip 20. Accordingly extreme ease of movement is ensured when changing the position of the lamp body.

On releasing the handlebars 19 or the handgrip 20 the capacity of the sensors 21 relative to earth is once again reduced and this is likewise registered by the control circuit 24. A signal is no longer transmitted to the amplifier 26 so that the switch 25 is no longer held closed and opens. Accordingly the excitation current for the electromagnets 22 is switched off and the springs 23 bring the brake shoes 31 back into contact with the brake surfaces 30. Thus all the constructional elements 11 to 16, which are connected to one another via rotary bearings, are again fixed relative to one another.

It is important for the handgrip 20 to be removable so that it can be sterilised or replaced by a sterilised handgrip prior to each new operation.

It is also important for the handlebars 19 and the sterilisable handgrip 20 to be coated with an insulated layer which acts as a dielectric so that they cannot be termed "contactable metal parts", which must be earthed in accordance with safety regulations.

A significant advantage of the operating theatre lamp of the invention is the fact that the electromagnets are not energised in the passive state so that there is then also no load on the current supply. Power consumption thus only occurs during the relatively shorter time intervals necessary for movement of the lamp body 16.

I claim:

1. An articulated operating theatre lamp of the type mounted to a support comprising:

a lamp unit having a grasping surface; and an articulated support arm assembly means for mounting said lamp unit from the support, said mounting means including:

a plurality of support arms;

pivot joints for joining said support arms to one another;

means for normally locking said pivot joints to inhibit relative movement of said support arms joined by respective ones of said pivot joints; and means for simultaneously electrically releasing said locking means in response to a user touching said grasping surface to allow said pivot joint means to freely pivot during a period said grasping surface is being touched by the user so said lamp unit is movable to a desired position during such period and so said lamp unit is inhibited from movement by said locking means otherwise.

2. The lamp of claim 1 wherein said releasing means includes a capacitive proximity sensor.

3. An articulated operating theatre lamp comprising a first support element mountable on one of a wall and a ceiling; a substantially horizontally disposed boom having first and second ends, with said first end of said boom being connected to said support element; a first rotary bearing defining a first substantially vertical axis of rotation and disposed to permit pivotal movement of said boom in a generally horizontal plane about said first substantially vertical axis of rotation; a substantially vertically disposed tube having first and second ends, with said first end of said substantially vertically disposed tube being connected to said second end of said boom; a rod having first and second ends; a spring hinge defining a second substantially horizontal axis of rotation, said spring hinge being disposed between said first end of said rod and said second end of said vertical tube and permitting movement of said rod about said second substantially horizontal axis of rotation; a second rotary bearing defining a third substantially vertical axis of rotation and disposed to permit rotation of said rod about said third substantially vertical axis of rotation; a support element having first and second ends; a third rotary bearing defining a fourth axis of rotation connecting said first end of said support element to said second end of said rod; a lamp unit; a fourth rotary bearing defining a fifth axis of rotation connecting said lamp unit to said second end of said support element, with said fifth axis of rotation being disposed substantially at right angles to said fourth axis of rotation; wherein said spring hinge substantially balances the torque generated about said second horizontal axis by the weight of said lamp unit, of said rod and of said support element; first, second, third, fourth and fifth brake mechanisms each associated with a respective one of said first, second, third and fourth rotary bearings and said spring hinge, each said brake mechanism comprising a cooperating brake pad and brake surface, spring means for urging said brake pad and said brake surface into contact with one another to generate a braking torque preventing rotation of the associated rotary bearing, and electromagnetic means responsive to control signals to selectively produce separation of said brake pad and said brake surface to remove said braking torque; and operator controlled switch means for generating said control signals for said brake mechanisms.

4. An operating theatre lamp in accordance with claim 3 wherein said first rotary bearing is provided between and connects said support element with said first end of said boom.

5. An operating theatre lamp in accordance with claim 3 wherein said second rotary bearing is provided between and connects the first end of said substantially vertically disposed tube with said second end of said boom.

6. An operating theatre lamp in accordance with claim 3, characterised in that said electromagnetic means in each of said brake mechanisms are connected in parallel to said operator controlled switch means so that actuation of all said brake mechanisms takes place simultaneously.

7. An operating theatre lamp in accordance with claim 3 wherein the braking torque of each of said brake mechanisms is selected to that in the event of electrical failure said lamp unit can nevertheless be maneuvered manually.

8. An operating theatre lamp in accordance with claim 3, wherein handle means is provided on said lamp unit to permit maneuvering of the said lamp unit by an operator.

9. An operating theatre lamp in accordance with claim 8 wherein said handle means are electrically insulated relative to said lamp unit; wherein a sensor having a capacity relative to earth is arranged in said handle means; wherein an electrical control circuit responsive to capacity changes is connected to said sensor; and wherein a switch is provided which is actuated by said control circuit, with said sensor, said control circuit and said switch forming said operator controlled switch means.

* * * * *